(No Model.)  
2 Sheets—Sheet 1.
W. S. DODGE.
TYPE WRITING MACHINE.
No. 446,381.  Patented Feb. 10, 1891.
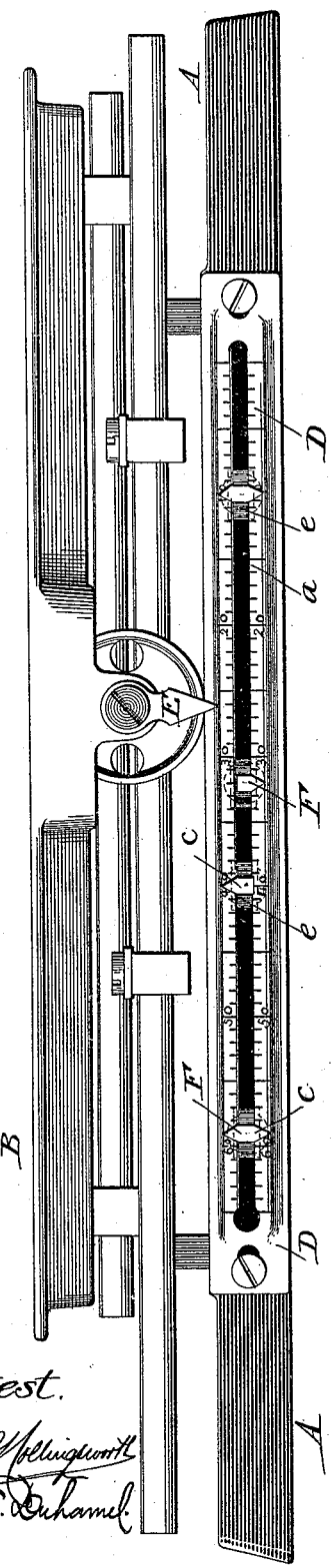
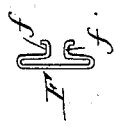
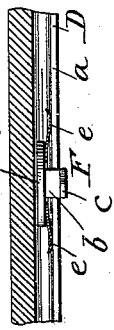
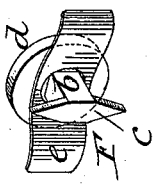
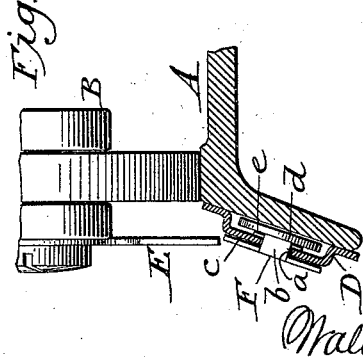
Attest.  
Sidney P. Hollingsworth  
James T. Duhamel  
Inventor.  
Walter S. Dodge.

(No Model.) 2 Sheets—Sheet 2.
W. S. DODGE.
TYPE WRITING MACHINE.
No. 446,381. Patented Feb. 10, 1891.
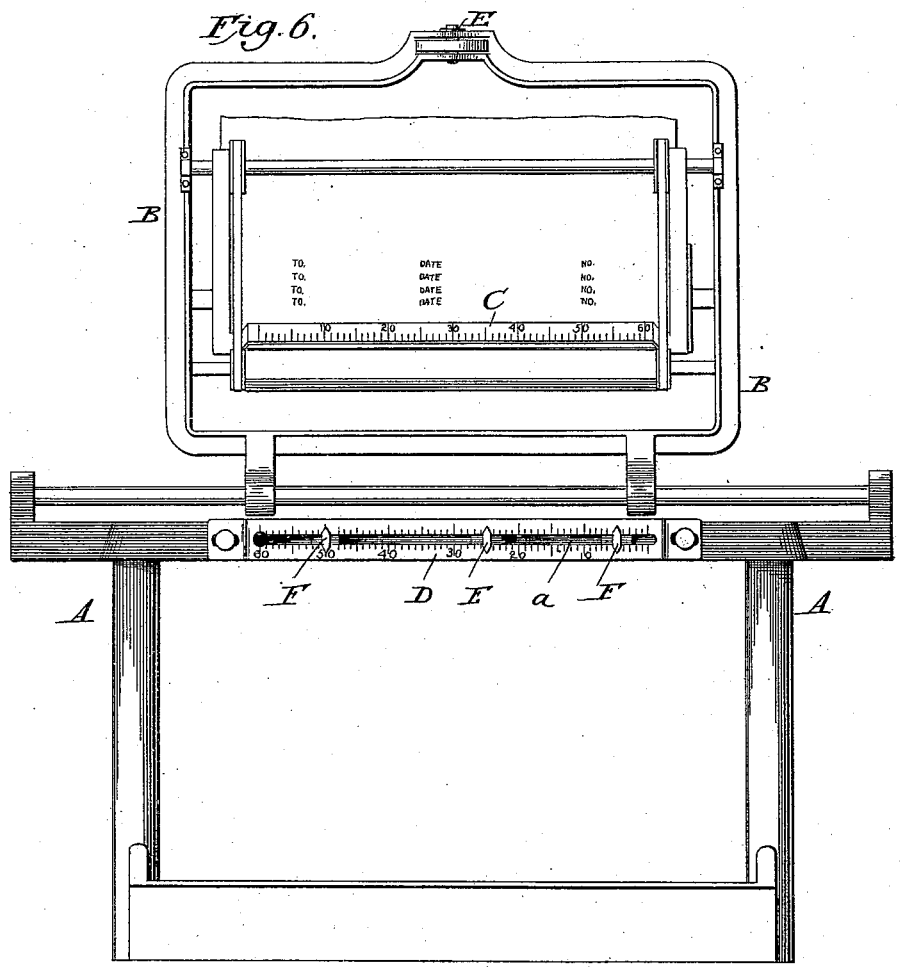
Attest:
James D. Duhamel
Horace A. Dodge
Inventor:
Walter S. Dodge

UNITED STATES PATENT OFFICE.

WALTER S. DODGE, OF WASHINGTON, DISTRICT OF COLUMBIA, ASSIGNOR TO THE REMINGTON STANDARD TYPE-WRITER MANUFACTURING COMPANY, OF NEW YORK, N. Y.

TYPE-WRITING MACHINE.

SPECIFICATION forming part of Letters Patent No. 446,381, dated February 10, 1891.

Application filed May 14, 1890. Serial No. 351,749. (No model.)

*To all whom it may concern:*

Be it known that I, WALTER S. DODGE, a citizen of the United States, residing at Washington, in the District of Columbia, have invented certain new and useful Improvements in Type-Writing Machines, of which the following is a specification.

My invention relates to type-writing machines; and it consists in various features hereinafter set forth and claimed, whereby the writing of tabulated work is facilitated.

In the drawings, Figure 1 is a face view of a portion of a type-writing machine having my improvements applied thereto; Fig. 2, a vertical sectional view of the same; Fig. 3, a horizontal sectional view; Fig. 4, a perspective view of one of the pointers or indicators; Fig. 5, a side view of a modified form of one of the pointers or indicators; and Fig. 6, a face view of a portion of a Remington machine, showing the manner in which my invention is used.

While the present invention is designed more particularly for use in connection with and upon the Remington machine, and while I have shown and will describe my improvements as applied to that class of machines, I do not wish it to be understood as limiting myself to such machine, as it will be obvious that the invention is susceptible of application to other styles of machines than that illustrated.

A indicates the frame of a Remington machine, and B the traveling carriage, which moves from right to left during the printing.

Secured to the carriage is a scale C, graduated to correspond to the number of printing-spaces, and upon the front of the machine-frame is what I term a "tabulating-scale" D, which is graduated to correspond with the gradations upon the scale C. The gradation marks upon the scale C D are advisably, though not necessarily, numbered, and where numerals are employed the numbers on scale C will run from left to right and those on scale D from right to left. So far the arrangement is the same as in the Remington machines now in use.

It frequently becomes desirable to tabulate the work—that is, to print a series of columns lengthwise of the sheet and to begin each column at a predetermined point on the sheet. In order to print a single line in each and all of the columns during the travel of the carriage from right to left and to insure the printing of the first character in each column directly beneath the first character in the line above in the same column, it has heretofore been necessary to turn or lift the platen up to the position shown in Fig. 6 after the printing of each word and to note the space or number on the carriage-scale opposite which the first character of the column is to be printed. Suppose the words "To," "Date," and "No." are to be printed a number of times on a sheet, and it is desired to arrange them in columns as represented in Fig. 6. Now after determining, usually by experimentation, at what point each of these words or the first character of each word is to be printed, it has been necessary either to carry these starting-points or numbers in the mind, or to lift the carriage up after printing each word, in order to see where the first character of the next word is to be printed, and then to feed the carriage along until its pointer or indicator E comes opposite the corresponding space on the scale D, and then print the desired character. In order to overcome these objections, I provide the scale D with one or more adjustable pointers F, which may be variously constructed and applied.

In Figs. 1, 2, 3, and 6 the scale is provided with a longitudinal slot *a*, through which the shank *b* of the pointer projects, as shown in Figs. 2 and 3. On the outer end of the shank is secured or formed a pointed button *c*, which may extend either above or below the slot, or both above and below, both forms being shown in Fig. 1. A head or enlargement *d* is riveted or otherwise secured to the inner end of the shank *b*, so as to prevent the disengagement of the pointer from the scale, and in order to hold the pointers in their adjusted positions I interpose a spring *e* between the head *d* and the inner face of the scale. The spring may be dispensed with or be supplanted by a washer of felt or rubber, the purpose being merely to permit the pointers to be moved freely along the scale from end to end and at the same time hold them in their adjusted positions with sufficient force to prevent their accidental displacement.

In the construction shown in Figs. 1, 2, and 3 the scale is shown as struck up or indented from the rear side, so as to form a pocket to receive and guide the heads of the pointers, while in the construction shown in Fig. 6 the scale has its body made flat, but set away from the frame of the machine a distance equal to the thickness (more or less) of the head of the pointer.

Now with any of these various arrangements the manner of utilizing the scale and pointers is as follows, referring again to Fig. 6: After determining at what points the columns are to be begun, the pointers F are moved over or adjusted upon the scale D until they come opposite the points on the said scale corresponding to the point at which the printing of each column is to be begun. For instance, if the word "To" is to begin at 5, the word "Date" at 25, and the word "No." at 50, the pointers F will be placed opposite the numbers 5, 25, and 50 on the scale D, as shown in Fig. 6. After the pointers have once been adjusted it is not necessary to lift the carriage up to see where the first character of each column is to be printed, as the pointers F, which are always before the operator, tell at a glance at what point to begin printing. Whether or not the carriage has traveled far enough to bring the printing-point into printing position will be determined by the position of the carriage-pointer E, which moves over the scale D and the pointers F thereof. The number of pointers or indicators F used will of course vary according to the special work at hand, and in order to avoid mistakes which might occur from the presence of a number of these pointers I prefer to make them detachable or removable, so that those not in use may be out of the way and not mislead. In order to provide for this removability, I prefer to make the pointers with spring-arms $f f$, as shown in Fig. 5, so that by pressing the arms together they may be inserted into or withdrawn from the slot in the scale, the arms as soon as released bearing against the walls of the slot and holding the pointers in their adjusted positions.

In certain classes of type-writing machines the arrangement shown in the drawings is reversed—that is to say, the pointer or indicator E is affixed to the main frame, while the scale D is affixed to the traveling carriage; but such an arrangement as this in no way precludes the application of my invention to such machines.

Having thus described my invention, what I claim is—

1. In a type-writing machine, the combination, with a main frame, of a traveling paper-carriage provided with a pointer or indicator E, a longitudinally-slotted scale D, secured directly to the main frame to act in conjunction with the indicator, said scale being struck up or indented to form a pocket, as shown, and a series of buttons F, mounted in the slot and adjustable with reference thereto, all substantially as shown and described.

2. In a type-writing machine, the combination, with a main frame, of a traveling paper-carriage, a pointer or indicator E, a scale D to act in conjunction with the pointer, and a series of adjustable buttons F, applied to the scale and detachable therefrom without dismounting the scale, all substantially as shown and described.

In witness whereof I hereunto set my hand in the presence of two witnesses.

WALTER S. DODGE.

Witnesses:
W. R. KENNEDY,
HORACE A. DODGE.